United States Patent

Blanc-Brude

[11] Patent Number: 5,906,883
[45] Date of Patent: May 25, 1999

[54] SHEET ADHESIVE BY APPLICATION OF A PRESSURE

[76] Inventor: Dominique Blanc-Brude, 1, Rue d'Alembert, 38000 Grenoble, France

[21] Appl. No.: 08/920,263

[22] Filed: Aug. 22, 1997

[51] Int. Cl.⁶ .................. B32B 1/00; B32B 3/20
[52] U.S. Cl. .............. 428/178; 428/42.1; 428/188; 428/213; 428/343; 428/904.4
[58] Field of Search ................ 428/178, 188, 428/167, 354, 42.1, 141, 213, 317.1, 343, 904.4

[56] References Cited

U.S. PATENT DOCUMENTS

| 5,234,734 | 8/1993 | Hamada | 428/40 |
| 5,487,929 | 1/1996 | Rusincovitch, Jr. et al. | 428/40 |
| 5,589,246 | 12/1996 | Calhoun et al. | 428/120 |

FOREIGN PATENT DOCUMENTS

| A-12 45 523 | 7/1967 | Germany . | |
| A-44 11 562 | 2/1995 | Germany | D06N 7/00 |
| WO-A-95 17312 | 6/1995 | WIPO | B44C 5/04 |

Primary Examiner—Donald Loney
Attorney, Agent, or Firm—Wolf, Greenfield & Sacks, P.C.; James H. Morris

[57] ABSTRACT

The present invention relates to a sheet adhesive by pressure application including a substrate covered with an adhesive on a front surface, and non-adherent elements protruding with respect to the front surface and likely to yield by application of a pressure. The substrate includes a meshing of channels opening at least at one edge of the sheet, and the non-adherent elements are bands forming roofs above the channels.

18 Claims, 2 Drawing Sheets

SHEET ADHESIVE BY APPLICATION OF A PRESSURE

BACKGROUND OF THE INVENTION

1. Field of the Invention

The present invention relates to a sheet adhesive by pressure application, that is, a sheet which, when presented on a surface to which it is desired to be pasted, is effectively pasted only after application of a pressure. Such a structure has the advantage that an accurate positioning can be performed before definitive fixing.

2. Discussion of the Related Art

FIG. 1 shows in perspective and partial cross-sectional view a known sheet adhesive by pressure application, such as described in European patent application EP-A-0429269. This sheet includes a substrate 10 uniformly covered with an adhesive layer 12. Domes 14 are regularly distributed on adhesive layer 12. Domes 14 are formed of microballs 16 deposited on the surface of adhesive layer 12. Thus, domes 14 are not adherent.

Domes 14 are used to avoid that adhesive layer 12 contacts the surface on which the adhesive sheet is laid. The sheet can thus be displaced in contact with the surface to the desired position. A pressure is then applied on the sheet, which results in driving domes 14 into the adhesive layer and bringing the adhesive layer to contact with the surface.

A disadvantage of this adhesive sheet is that adhesive layer 12 must be relatively thick to accomodate domes 14 of sufficient height, which makes it of more difficult fabrication.

Further, any adhesive layer, especially that of the type of FIG. 1, has the disadvantage of trapping air bubbles upon pasting, which is prejudicial to aesthetics in the case where the sheet has a decorative function. This disadvantage is all the more difficult to avoid as the sheet surface area is significant, which makes the use of these adhesive sheets unpractical for wall paper, for example.

SUMMARY OF THE INVENTION

An object of the present invention is to provide a sheet adhesive by pressure application which, whatever its surface area, is not likely to trap air bubbles upon pasting.

This object is achieved, according to the present invention, by means of a sheet adhesive by pressure application including a substrate covered with an adhesive on a front surface, and non-adherent elements protruding with respect to the front surface and likely to yield by application of a pressure. The substrate includes a meshing of channels opening at least at one edge of the sheet, and the non-adherent elements are bands forming roofs above the channels.

According to an embodiment of the present invention, the rear surface of the sheet has a coating.

According to an embodiment of the present invention, the adhesive is also present on the roofs, where it is covered with a neutralizing product.

According to an embodiment of the present invention, the roofs have a trapezoidal profile.

According to an embodiment of the present invention, the channels have an undercut shape on the rear surface side.

According to an embodiment of the present invention, the roofs are integral with the substrate.

According to an embodiment of the present invention, he substrate is a plastic foam.

According to an embodiment of the present invention, the coating is a wall paper.

According to an embodiment of the present invention, the channels extend throughout the thickness of the substrate.

The foregoing objects, features and advantages of the present invention will be discussed in detail in the following non-limiting description of specific embodiments in connection with the accompanying drawings.

DETAILED DESCRIPTION

Figure 1:
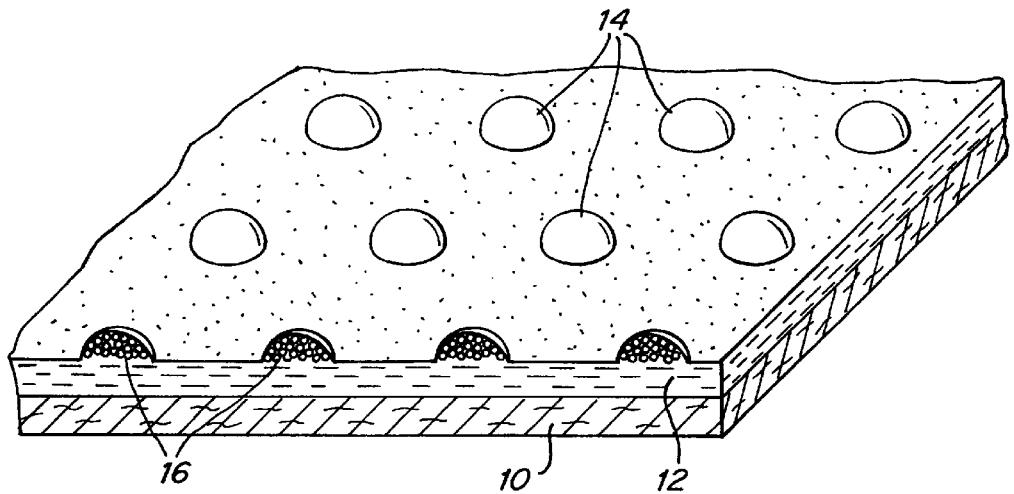
FIG. 1, previously described, shows a known sheet adhesive by pressure application.
Figure 2:
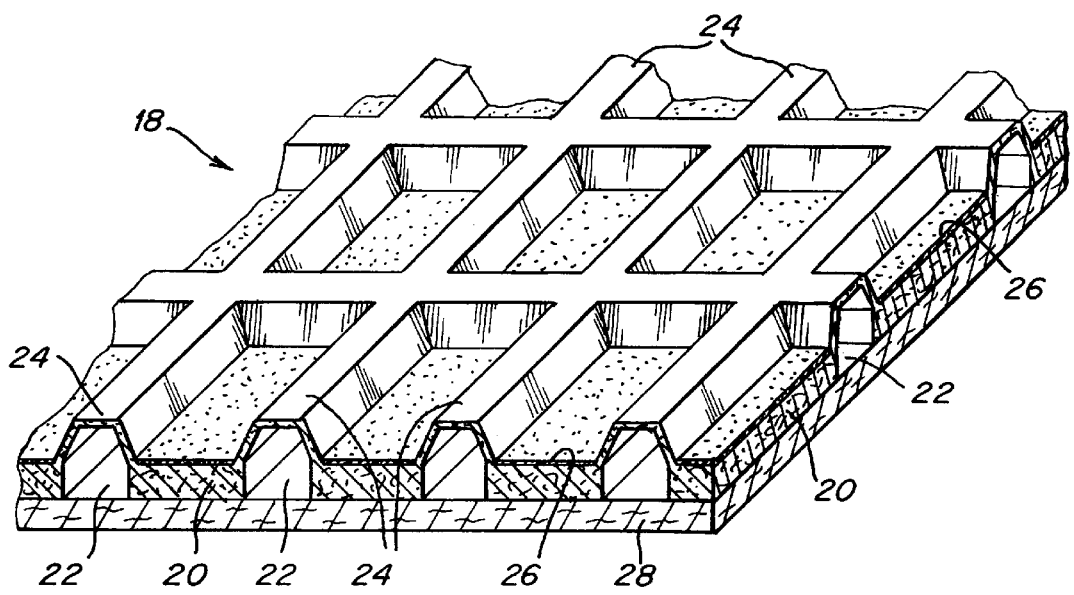
FIG. 2 shows in perspective and partial cross-sectional view an embodiment of a sheet adhesive by pressure application according to the present invention.

In FIG. 2, a sheet 18 adhesive by pressure application according to the present invention includes a slotted substrate 20. The slots may extend throughout the thickness of the substrate and form a meshing of channels 22 which open at the edges of the sheet. As shown as an example, the meshing is rectangular. Each channel 22 underlies a band forming a roof 24 protruding with respect to the front surface of sheet 18. These roofs 24 are substantially thinner than substrate 20 and, in the example shown, are integral with substrate 20.

The thickness of the roofs and the thickness of substrate 20 are chosen so that roofs 24 can, after collapsing, be contained in channels 22. The profile of roofs 24 is chosen to favor the collapsing in channels 22. For this purpose, the roofs have a trapezoidal profile, for example.

Substrate 20 is covered, on its front surface, in the areas included between roofs 24, with an adhesive layer 26 such as permanent acrylic adhesive.

In an application example, a coating 28 is fixed to the rear surface of sheet 18. More specifically, this coating 28 may be a wall paper decoration. Adhesive sheet 18 and coating 28 then altogether constitute an auto-adhesive wall paper band. Wall paper 28 may be formed of two sheets, the external sheet being strippable. Preferably, still in the context of wall paper, channels 22 are oblique with respect to the sides of the bands, so that a band edge is not likely to coincide with the axis of a channel 22.

Figure 3A:
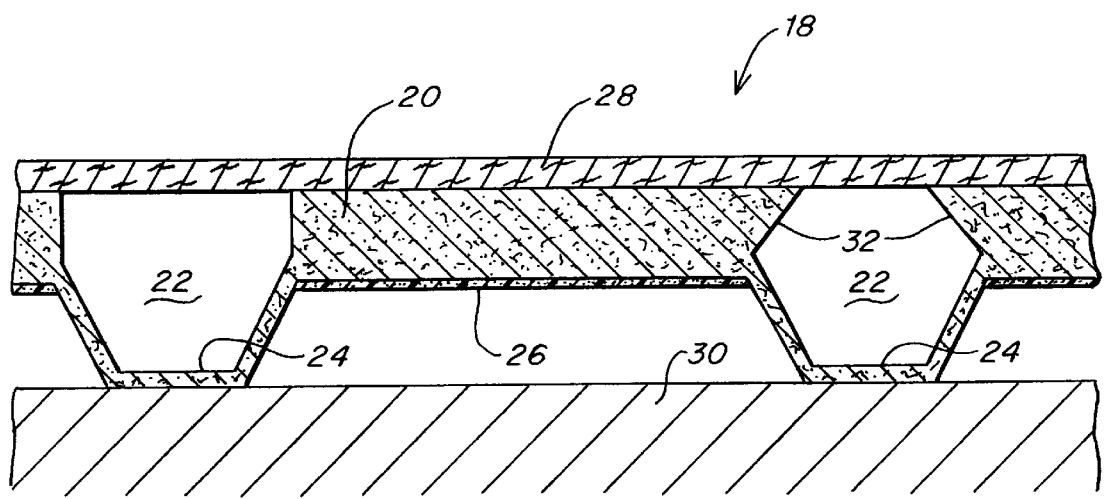
FIGS. 3A and 3B show a cross-sectional view of a sheet according to the present invention, before and after pressure application.
Figure 3B:
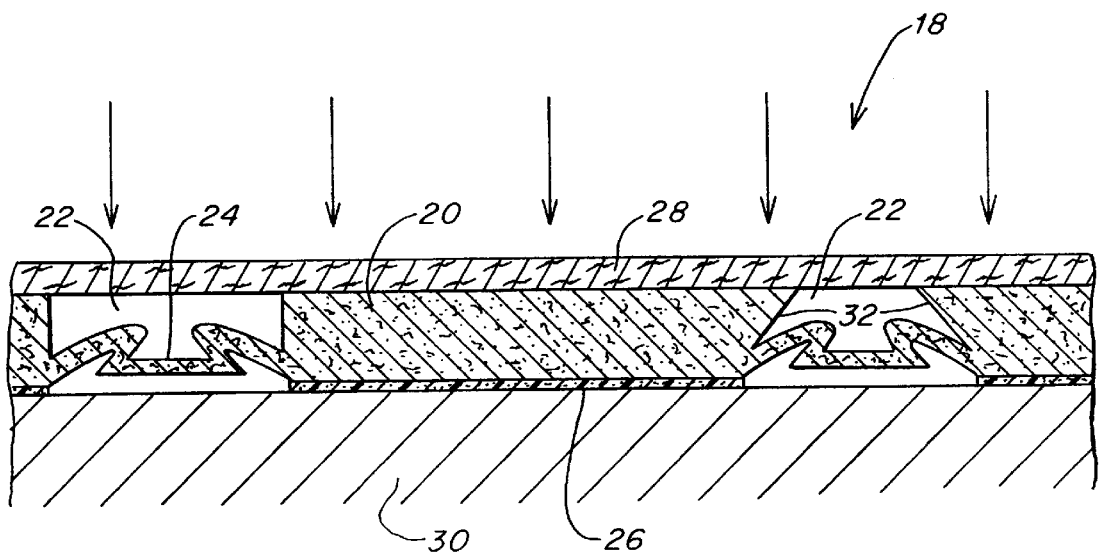

FIGS. 3A and 3B are meant to illustrate a use of the adhesive sheet according to the present invention.

In FIG. 3A, sheet 18 is laid on a surface 30. The tops of roofs 24 contact surface 30 and maintain adhesive 26 away from this surface. Roofs 24 being without adhesive, the sheet can be displaced while remaining in contact with the surface, until the desired positioning is obtained.

FIG. 3B illustrates sheet 18 after application of a pressure according to the shown arrows. This pressure causes the collapsing of roofs 24 which are entirely accomodated in channels 22, as shown. As a result, adhesive layer 26 is applied against surface 30, which causes the pasting of the sheet. The air located between surface 30 and each patch of adhesive 26 is discharged to the edge of the sheet along the folds formed between collapsed roof 24 and surface 30. Similarly, the air located in channels 22 is discharged along these channels to the edge of the sheet. Each patch of substrate 20, delimited by four roofs 24, has such a large thickness to surface ratio that it can be considered as rigid, that is, it does not risk to trap air bubbles.

The discharge of the air may be made easier by providing perforations (not shown) in roofs 24.

Substrate 20 is for example a thermoplastic material. Channels 22 and roofs 24 may then be formed with substrate 20 by molding or thermoforming, according to conventional methods. In the context of an application to wall paper, substrate 20 should be light and easy to cut. Preferably, substrate 20 is made from a moldable cellulose paste, such a paste being of low cost and easy to work. Substrate 20 could also be a foam, such as polyurethane foam or other, or else Vinyl or polyethylene.

In an embodiment of the present invention, adhesive 26 is applied on substrate 20 between roofs 24, for example through a stencil which hides the roofs. Another solution consists of applying adhesive 26 on the entire substrate, including roofs 24, and then neutralizing the adhesive on roofs 24. This neutralization is performed, for example, by applying on roofs 24 a paint of acrylic type, an ink, a resin, or a powder.

An advantage of the present invention is that it is not necessary to provide a protective sheet to protect adhesive 26. Sheet 18 may be directly rolled on itself. The roofs 24 prevent the pasting of adhesive 26 of the front surface of a turn of the roll to the rear surface of the adjacent turn, provided that attention is paid to not applying a pressure which would cause the collapsing of roofs 24.

In some cases, sheet 18 could be manufactured and stored as rolls, without previously fixing a coating or a wall paper 28 on the sheet. In this case, it is possible for a roof 24 of a turn to coincide with a channel 22 of an adjacent turn, which could cause a pasting at the level of these two turns between portions of the front and rear surfaces of the sheet. In order to avoid this, as shown on the right side in FIGS. 3A and 3B, channels 22 may have, on the rear surface side, undercut shapes 32 which partially close channels 22. Such undercut shapes may be obtained by thermoforming or casting the supple plastic material constituting substrate 20.

In the context of the application of the present invention to wall paper, examplary dimensions may be taken on FIGS. 3A and 3B by considering them at scale 20.

Those skilled in the art will know how to choose between the different materials of the elements forming the adhesive layer of the present invention according to the desired application.

Of course, the present invention is likely to have various alterations, modifications, and improvements which will readily occur to those skilled in the art. For example, roofs 24 may be formed of bands fixed on substrate 20, or by a corrugated sheet pasted on the front surface of the substrate. The coherence of the substrate is then ensured by the fact that channels 22 do not extend up to the rear surface. The roof bands may be pasted on the adhesive previously applied on the front surface of the substrate. Profiles other than trapezoidal may be used for the roofs.

I claim:

1. An adhesive sheet that adheres by an application of a pressure, the adhesive sheet having a plurality of edges and comprising:
    a substrate having a first thickness, the substrate including:
        a front surface at least partially covered with an adhesive; and
        a meshing of channels opening at least at one edge of the plurality of edges; and
    a plurality of non-adherent elements having a second thickness smaller than the first thickness of the substrate, the plurality of non-adherent elements connected to and protruding from the front surface of the substrate.

2. The adhesive sheet of claim 1, wherein:
    the substrate further includes a rear surface; and
    the adhesive sheet further includes a coating on the rear surface.

3. The adhesive sheet of claim 1, wherein:
    the adhesive at least partially covers the plurality of non-adherent elements; and
    the plurality of non-adherent elements is further covered with a neutralizing product to neutralize the adhesive thereon.

4. The adhesive sheet of claim 1, wherein the non-adherent elements have a trapezoidal profile.

5. The adhesive sheet of claim 1, wherein a first width of each channel of the meshing of channels as measured on a rear surface of the substrate is smaller than a second width of each channel as measured on the front surface of the substrate.

6. The adhesive sheet of claim 1, wherein the plurality of non-adherent elements is integral with the substrate.

7. The adhesive sheet of claim 2, wherein the substrate is a plastic foam.

8. The adhesive sheet of claim 2, wherein the substrate is a moldable cellulose paste.

9. The adhesive sheet of claim 2, 7, or 8, wherein the coating is a wall paper.

10. The adhesive sheet of claim 1, wherein:
    the meshing of channels extends throughout the first thickness of the substrate; and
    the plurality of non-adherent elements forms a plurality of roofs having the second thickness, each roof being over a respective channel of the meshing of channels.

11. The adhesive sheet of claim 10, wherein the plurality of roofs is constructed and arranged so as to yield by the application of the pressure.

12. The adhesive sheet of claim 11, wherein the second thickness of each roof and the first thickness of the substrate are such that each roof, upon yielding to the application of the pressure, is contained within the respective channel.

13. The adhesive sheet of claim 12, wherein each roof yields such that air located in the meshing of channels is discharged along the channels to at least the one edge of the sheet.

14. The adhesive sheet of claim 13, wherein each roof is perforated to facilitate a discharge of air.

15. The adhesive sheet of claim 1, wherein the adhesive is a permanent acrylic adhesive.

16. The adhesive sheet of claim 2, wherein:
    the coating is a wall paper, such that the adhesive sheet and the wall paper form an auto-adhesive wall paper band, the wall paper band having two longitudinal edges; and
    each channel of the meshing of channels is transverse to the two longitudinal edges, such that the two longitudinal edges do not coincide with an axis of any channel.

17. The adhesive sheet of claim 6, wherein:
    the substrate is a thermoplastic material; and
    the non-adherent elements and the substrate are integrally formed by molding.

18. A pressure sensitive adhesive sheet having at least one edge, comprising:

a substrate having a front surface and including a meshing of channels opening at least at the at least one edge;

an adhesive at least partially covering the front surface; and a plurality of non-adherent roofs covering the meshing of channels and protruding from the front surface, a first thickness of the substrate being larger than a second thickness of the plurality of non-adherent roofs, the plurality of non-adherent roofs being constructed and arranged so as to collapse into the meshing of channels when a pressure is applied to the plurality of non-adherent roofs.

* * * * *